United States Patent [19]
Buer

[11] Patent Number: 5,963,104
[45] Date of Patent: *Oct. 5, 1999

[54] STANDARD CELL RING OSCILLATOR OF A NON-DETERMINISTIC RANDOMIZER CIRCUIT

[75] Inventor: Mark Leonard Buer, Chandler, Ariz.

[73] Assignee: VLSI Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/941,803

[22] Filed: Oct. 3, 1997

Related U.S. Application Data

[63] Continuation of application No. 08/632,602, Apr. 15, 1996, abandoned.

[51] Int. Cl.⁶ ........................................... G06F 1/02
[52] U.S. Cl. ............................. 331/78; 364/717
[58] Field of Search ................................. 331/78

[56] References Cited

U.S. PATENT DOCUMENTS

4,799,259  1/1989  Ogrodski .................................. 380/46
5,570,307  10/1996  Takahashi .............................. 364/717

Primary Examiner—Timothy P. Callahan
Assistant Examiner—An T. Luu
Attorney, Agent, or Firm—Wagner Murabito & Hao

[57] ABSTRACT

A digital standard cell implemented ring oscillator circuit for placement within an integrated circuit device. In one embodiment, the digital standard cell ring oscillator circuit is used in conjunction with a system for generating non-deterministic (e.g., random) output signals which can be used for data encryption. A random number generator circuit is used within the above system and the standard cell ring oscillator of the present invention is used to provide oscillator signals to different frequency legs of the random number generator circuit and can also be used to supply a jitter clock. The timing characteristics (e.g., frequency) of the standard cell ring oscillator vary with its fabrication process, its fabrication environment, and the temperature when used; timing characteristics are therefore unpredictable from "chip" to "chip" and from one point in time to another with respect to the same "chip." This increases the non-deterministic properties of the random number generator. By using a standard cell ring oscillator in lieu of a custom analog oscillator, the present invention oscillator is readily portable from one design environment to another, is readily modifiable to realize different frequencies, and provides a more dense integrated circuit layout because the oscillator of the present invention can be integrated within other standard cell layout areas of the integrated circuit and also eliminates block to block routing resources. This latter characteristic makes the oscillator difficult to locate within the integrated circuit layout, increasing the difficulty of externally compromising the random number generation.

15 Claims, 10 Drawing Sheets

```
--*********************************************
--              SELECT STANDARD CELL LIBRARY
--********************************************* library ieee;
use ieee.std_logic_1164.all;

--compass compile_off
library vsc653d;
use vsc653d.all;
--compass compile_on

--*********************************************
--              ENTITY
--********************************************* entity Ring_Osc is port ( clk_en_1 : std_logic;
               clk      : std_logic);

end Ring_Osc;
```

FIG. 7A

```
--***********************************************
--                  ARCHITECTURE
--*********************************************** architecture synth of Ring_Osc is
                                      /—710
    constant NumberGates   : integer := 160        -- Be Even
    constant Thals_period  : time    := 71.43 ns;  -- Simulation Emulation signal xorbus : std_logic_vector (1 to NumberGates);
    signal set_1  : std_logic component xor_gate
        port ( A1 : in   std_logic;
               A2 : in   std_logic;
               Z  : out  std_logic);
    end component;

component inventer
        port ( I : in   std_logic;
               Z : out  std_logic);
    end component;

begin
    set_1 <= '1';

OUTPUT_BUF: inverter port map ( I=> xorbus (1), Z=> CLK);

xorbus (1) <= (xorbus (NumberGates) and not CLK_EN_L) after Thalf_period;

XORTREE: for i in 1 to NumberGates - 1 generate
        XORB : xor_gate port map (A1=> xorbus (i), A2=> set_1, Z=> xorbus (i+1));
    end generate end synth;
```

FIG. 7B

STANDARD CELL RING OSCILLATOR OF A NON-DETERMINISTIC RANDOMIZER CIRCUIT

This application is a File-Wrapper Continuation of U.S. patent application entitled, "STANDARD CELL RING OSCILLATOR OF A NON-DETERMINISTIC RANDOMIZER CIRCUIT" Ser. No.: 08/632,602 filed Apr. 15, 1996, now abandoned.

TECHNICAL FIELD

The present invention relates to the field of generating random numbers using integrated circuit designs. More specifically, the present invention relates to the field of using oscillator signals within such integrated circuit designs.

BACKGROUND ART

Integrated circuit randomizers can be used to generate pseudo random numbers or random sequences of signals by using pseudo random number ("PRN") generators. In conjunction with PRN generators, linear feedback shift register ("LSFR") generators can also be used to increase the non-deterministic characteristics of the randomizer. The non-deterministic nature of an integrated circuit randomizer can be drastic. For example, assuming a LSFR circuit of 200 bits in length, theoretically the output data block pattern is not expected to repeat itself more than once in $2^{200}$ bits. This nature has lead the use of integrated circuit randomizers in several data encryption applications for secure data transfer and access.

To further enhance security, in many applications it is desirable to digitally generate a random number (or data block), which is then stored in a memory unit (e.g. non-volatile). Preferably, a single integrated circuit can contain the random number generator, the memory unit, and other system circuits as required.

Non-volatile memory components are commonly used in many integrated circuit applications, including systems in which an integrated circuit containing at least a part of the memory retains a unique identification number used for securing access to the system and/or its memory. On-chip generation (e.g. via a randomizer circuit) and storage of a highly non-deterministic (e.g., near random) data block permits integrated circuit manufacturers to encode a unique identification (e.g., a number) for each integrated circuit which can be used for securing authorized access to the integrated circuit and/or its incorporated memory. Within the integrated circuit, the unique identification is difficult to locate and comprehend. The above makes unauthorized use and access of the integrated circuit very difficult, as well as increases the difficulty in cloning the integrated circuit.

Within the above systems, persons seeking to access to the information stored in the memory or seeking to use the integrated circuit must first properly replicate the identification number. In a public-key encryption system, the pseudo random data block of digital bits that define the private deciphering key is maintained in secrecy to preserve the integrity of the system. One method of preserving secrecy of such keys is to generate the key through a randomizer circuit that uses a pseudo random process and then stores the key in the memory. A random seed (initialization vector) routine, that need not be kept secure due to its non-deterministic nature, produces a random bit stream in cryptographic applications.

Figure 1:
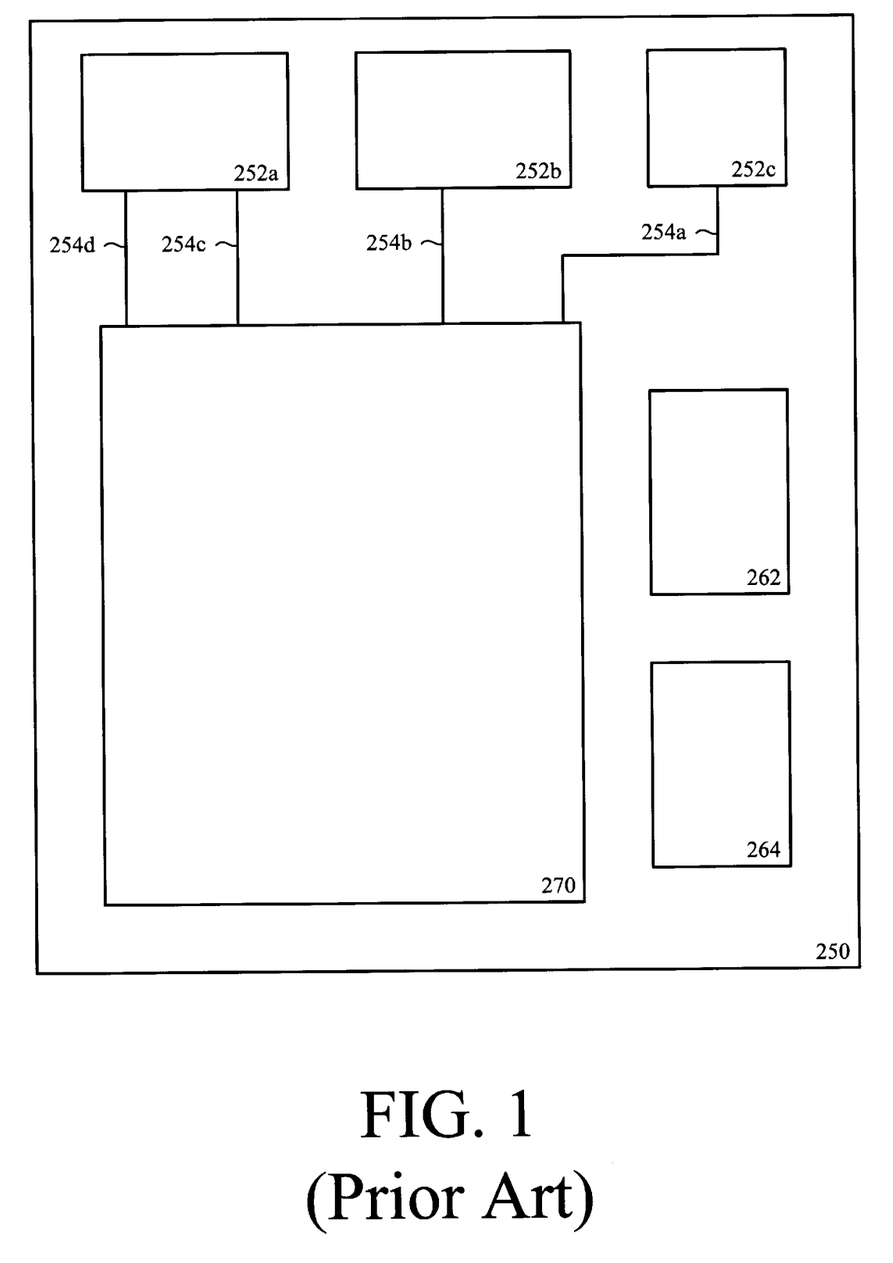
FIG. 1 illustrates a prior art integrated circuit layout of a randomizer circuit in accordance with the prior art and specifically illustrates the separation of the custom analog oscillator circuits and block-to-block routing resources.

FIG. 1 illustrates an exemplary layout 250 of a prior art randomizer circuit. There are different circuit stages of the randomizer circuit which are implemented using volatile memory blocks 262, 264, a standard cell layout area 270, and separated layout areas 252a–252c. The separated layout areas (e.g., hard layout areas) are allocated for custom designed analog oscillators that are used in different frequency legs of a random number generator circuit of the randomizer. Block to block routing resources 254a–254d are used to couple the outputs of the custom analog oscillators to the standard cell layout area 270 which contains the remainder of the digital logic portions of the randomizer.

Because the prior art oscillators are analog, and also because they are custom designed, the oscillators of the prior art randomizer layout 250 are not integrated within the standard cell layout area 270. This layout separation has a negative impact on the overall density of the integrated circuit because integration offers more ways to decrease overall design area and eliminates wasted space within and between the hard layouts 252a–252c. Further, the block to block routing resources 254a–254d consume area thus separation increases the overall layout size.

Further, because the prior art oscillators need to be separate from the standard cell layout area 250, they are relatively easy to locate and identify under an external intrusion. In this case, the oscillator block routing resources can be separated, once located, and thus violate the integrity of the random number generation process. For instance, the randomizer can be modified by cutting the oscillator outputs such that the generated number can be predicted (e.g., forced to zero, or some other value to circumvent a zero check that is predictable; the randomizer can be replaced by a counter).

Further yet, since the prior art oscillators are custom analog circuits, they are not readily portable between different fabrication and circuit technologies. In order to port a prior art custom analog oscillator circuit from one technology to another, the prior art oscillator needs to be completely redesigned and simulated, thus increasing design time. Also, even within the same technology, the prior art oscillators require extensive redesign to realize different frequencies. Prior art custom analog oscillators also tend to consume a relatively large amount of power.

Accordingly, what is needed is a randomizer circuit that efficiently utilizes layout area and that is readily ported between different fabrication and circuit technologies without a large of amount of custom redesigning. The present invention provides these advantageous features. What is needed is an oscillator circuit that can be implemented within the standard cell layout area of the randomizer circuit layout so that the oscillator is difficult to locate. What is needed yet is an oscillator design that can be readily re-characterized to implement different frequencies. The present invention provides such an advantageous oscillator circuit and design. These and other advantages of the present invention will become apparent within discussions of the present invention herein.

DISCLOSURE OF THE INVENTION

A digital standard cell implemented ring oscillator circuit is described for placement within an integrated circuit device. In one embodiment, the digital standard cell ring oscillator circuit is used in conjunction with a system for generating non-deterministic (e.g., random) output signals which can be used for data encryption purposes. A random number generator circuit is used within the above system and the standard cell ring oscillator of the present invention is used to provide oscillator signals to different frequency legs of the random number generator circuit. The standard cell oscillator can also be used to supply a jitter clock. The timing characteristics (e.g., frequency) of the standard cell ring oscillator vary with its fabrication process, its fabrication environment, and the temperature when used; these timing characteristics are therefore unpredictable from "chip" to "chip" and from one point in time to another with respect to the same "chip" and vary with respect to the environment. This characteristic adds to the non-deterministic properties of the random number generator. By using a standard cell ring oscillator in lieu of a custom analog oscillator, the present invention oscillator is readily portable from one design technology environment to another, is readily modifiable (e.g., readily re-characterized) to realize different frequencies within the same design environment, and provides a more dense integrated circuit layout because the oscillator of the present invention (1) can be integrated within other standard cell layout areas and (2) this integration eliminates block to block routing resources. This latter characteristic also makes the oscillator very difficult to locate within the integrated circuit layout, thus increasing the difficulty of compromising the random number generation process through external intrusion. The individual oscillator legs can also be characterized for different process points, e.g., selecting one frequency at worst case and another at the best case.

More specifically, embodiments of the present invention include a random number generator circuit for generating a pseudo random sequence of bits, the circuit comprising: (a) a plurality of frequency legs each generating a frequency leg output signal that contains non-deterministic data, wherein each frequency leg comprises a respective frequency leg oscillator circuit that generates a frequency signal for the respective frequency leg; (b) an XOR circuit coupled to receive frequency leg output signals from the plurality of frequency legs, the XOR circuit for generating an output signal of the pseudo random sequence of bits, wherein each frequency leg oscillator circuit is a ring oscillator circuit fully implemented with digital standard cells from a standard cell library and comprises: an inverter stage circuit coupled to receive an input signal at an input port, the inverter stage circuit comprised of n serially coupled inverting circuits wherein an output of the nth inverting circuit of the inverter stage is an inversion of the input signal; and a loopback connection for feeding back the output of the nth inverting circuit to the input port of the inverter stage circuit.

BEST MODE FOR CARRYING OUT THE INVENTION

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

Standard Cell Ring Oscillator Circuit

Figure 2:
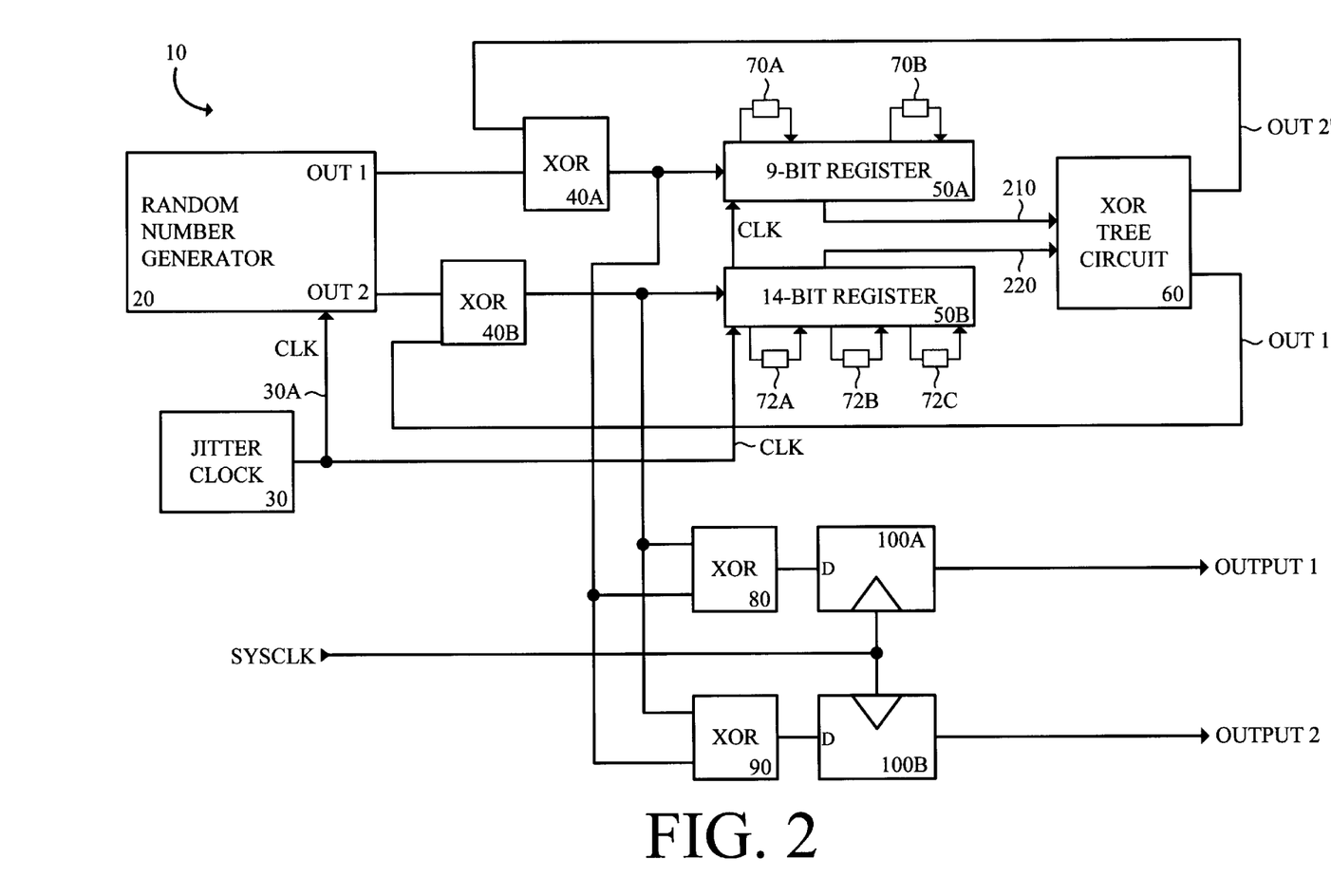
FIG. 2 is a block diagram of a digital randomizer circuit (e.g., system) in accordance with the present invention that uses the standard cell implemented ring oscillator circuit of the present invention.

The present invention includes a ring oscillator circuit (FIG. 5A and FIG. 5B) that is implemented using digital standard cells and can therefore be integrated within the standard cell layout area of a randomizer circuit. The standard cell ring oscillator ("SRO") circuit 500 of the present invention can be represented by a VHDL (Verilog Hardware Description Language) description wherein only a few constants (e.g., gate number) define the SRO circuit 500. These constants can be varied to readily recharacterize the SRO circuit 500 for porting it to different design technology environments and for realizing different frequencies within the same design technology environment. In one embodiment, the SRO circuit 500 is fully digital using standard cell elements of a standard cell library and is used specifically within frequency legs of a random number generator circuit 20 (FIG. 3) of a randomizer circuit 10 (FIG. 2). The SRO circuit 500 can also be used to implement a jitter clock 30 (FIG. 2).

Although the present invention SRO circuit 500 can be used within a variety of different randomizer designs, an exemplary randomizer circuit 10 is described below.

Randomizer Circuit 10

FIG. 2 depicts a randomizer circuit 10 ("randomizer circuit") that can be fabricated on a single integrated circuit "chip" to generate non-deterministic (e.g., pseudo random) data output signals. In the preferred embodiment, for reasons of reliability, fault tolerance or robustness, two independent channels of random data are generated, denoted OUTPUT 1 and OUTPUT 2. Suitable architecture for such an on-chip system is disclosed in a co-pending U.S. patent application, assigned to the assignee of the present invention, and entitled ON-CHIP RANDOMLY SELF-PROGRAMMABLE NON-VOLATILE MEMORY ARCHITECTURE, Ser. No. 08/369,220, filed Jan. 6, 1995, with inventor Richard J. Takahashi.

In FIG. 2, randomizer circuit 10 includes a random number generator circuit 20 (discussed in detail in FIG. 3) that receives a clock (CLK) signal over line 30a from a jitter clock 30, and also outputs two non-deterministic data signals, denoted OUT 1 and OUT 2. The OUT 1 and OUT 2 signals are input to first and second intermediate XOR gates, 40A, 40B. Intermediate XOR gates 40B and 40A also input signals OUT 1' and OUT 2', respectively, which are cross-fed back from an exclusive OR ("XOR") tree circuit 60.

The outputs from intermediate XOR gates 40A and 40B are coupled as respective inputs to first and second shift registers 50A, 50B, the shift registers being M-bit and N-bit in length, respectively. The output signals from the shift registers 50A and 50B are supplied over buses 210 and 220, respectively, and are input to XOR tree circuit 60 for entropy spreading. Shift registers 50A, 50B expand the random stream from the random number generator circuit 20. To minimize any possible correlation effects, shift registers 50A, 50B are preferably of odd and even numbered bit-lengths, in order to offset one another. In practice, at least a 9-bit register length is sufficiently long to promote randomness, and making the bit lengths of the two shift registers 50A, 50B different by approximately five bits further promotes randomness. Therefore, in an exemplary embodiment of the present invention, shift register 50A contains 14 bits and shift register 50B contains 9 bits. Of course, shift registers of different bit lengths could be used, and depending on the degree of random nature that is required, registers 50A and 50B can be eliminated all together in some embodiments.

To increase the flatness of the random stream, delay elements (e.g., 70A, 70B, 72A, 72B, 72C) are inserted in series with individual bit positions in each shift register 50A and 50B of FIG. 2. Each delay element (e.g., 70A, 70B, 72A, 72B, 72C) includes a pair of metastable D-type flip-flops, with a gate delay inserted in series with the common jitter clock (CLK) supplied over line 30a between flip-flops. The nominal gate delay is made equal in time to the flip-flop D-to-Q delay. This ensures that data from the adjacent flip-flop routinely violates the set-up and hold times of the following flip-flop. In one embodiment, the delaying gate (e.g., 70A, 70B, 72A, 72B, 72C) has unequal output rise and fall times, e.g., a generic NOR gate.

In one embodiment of the present invention randomizer circuit 10, for the 9-bit shift register 50A, a delay unit 70A is inserted between bit register positions 3 and 4, and delay unit 70B is inserted between bit register positions 7 and 8. For the 14-bit shift register 50B, delay units 72A, 72B, and 72C, are inserted between bit register positions 1 and 2, between bit register positions 5 and 6, and between bit register positions 10 and 11, respectively. Of course, a different number of delay units can inserted in the register stream at different bit positions. Alternatively, the delay units can also be eliminated, at the risk of decreased random nature.

As shown in FIG. 2, the outputs (210 and 220) from shift registers 50A, 50B are coupled as input to XOR tree circuit 60, whose outputs OUT 1', OUT 2' are feedback to the XOR gates 40A, 40B in a cross-strap fashion.

As noted, XOR gates 40A, 40B input signals OUT 1, OUT 2 that originate from the random number generator circuit 20, and also input the feedback signals OUT 2', OUT 1' from the XOR tree circuit 60. The OUT 1' signal represents the stream resulting from OUT 1 from the random number generator 20, whereas the OUT 2' signal represents the stream resulting from OUT 2. This configuration allows randomizer circuit 10 to better tolerate single point failures without compromising the integrity of the random stream. It is appreciated that the primary source of the random noise or random data stream is the random number generator circuit 20, with shift registers 50A, 50B acting as a secondary source.

The jitter clock 30 of FIG. 2 generates a phase noise clock (or jitter) CLK signal over line 30a for the random number generator circuit 20 and for shift registers 50A, 50B to promote clock edge uncertainty. As such, jitter clock 30 ensures that D-type flip-flops in randomizer circuit 10 randomly upset oscillator re-clocking within random number generator circuit 20 (see FIG. 3). In one embodiment, jitter clock 30 is a digital mixer or rate multiplier that operates based on the difference between two clock frequencies (F1 and F2) generated by two oscillators. The D-input of the digital mixer receives the first oscillator frequency F1 while the clock input to the digital mixer receives the higher frequency F2. The Q-port of the digital mixer outputs a signal of frequency F2-F1. In one exemplary embodiment, F1=15 MHz, F2=16 MHz, and the digital mixer output signal is 1 MHz with jitter being produced whenever the F1 and F2 signals phase shift relative to each other.

Figure 5A:
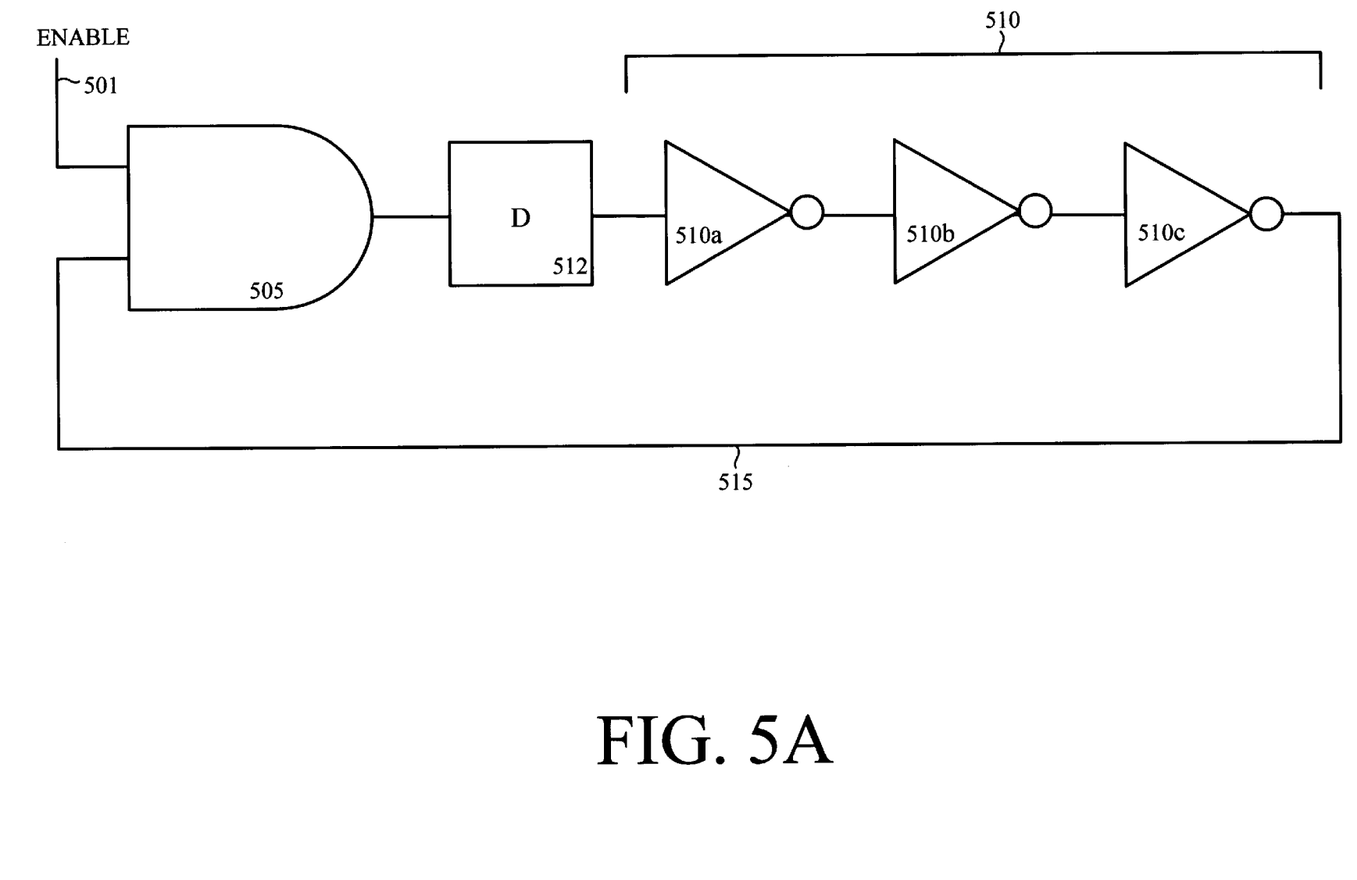
FIG. 5A is a circuit schematic diagram of a digital standard cell implemented ring oscillator circuit of the present invention for the general case.
Figure 5B:
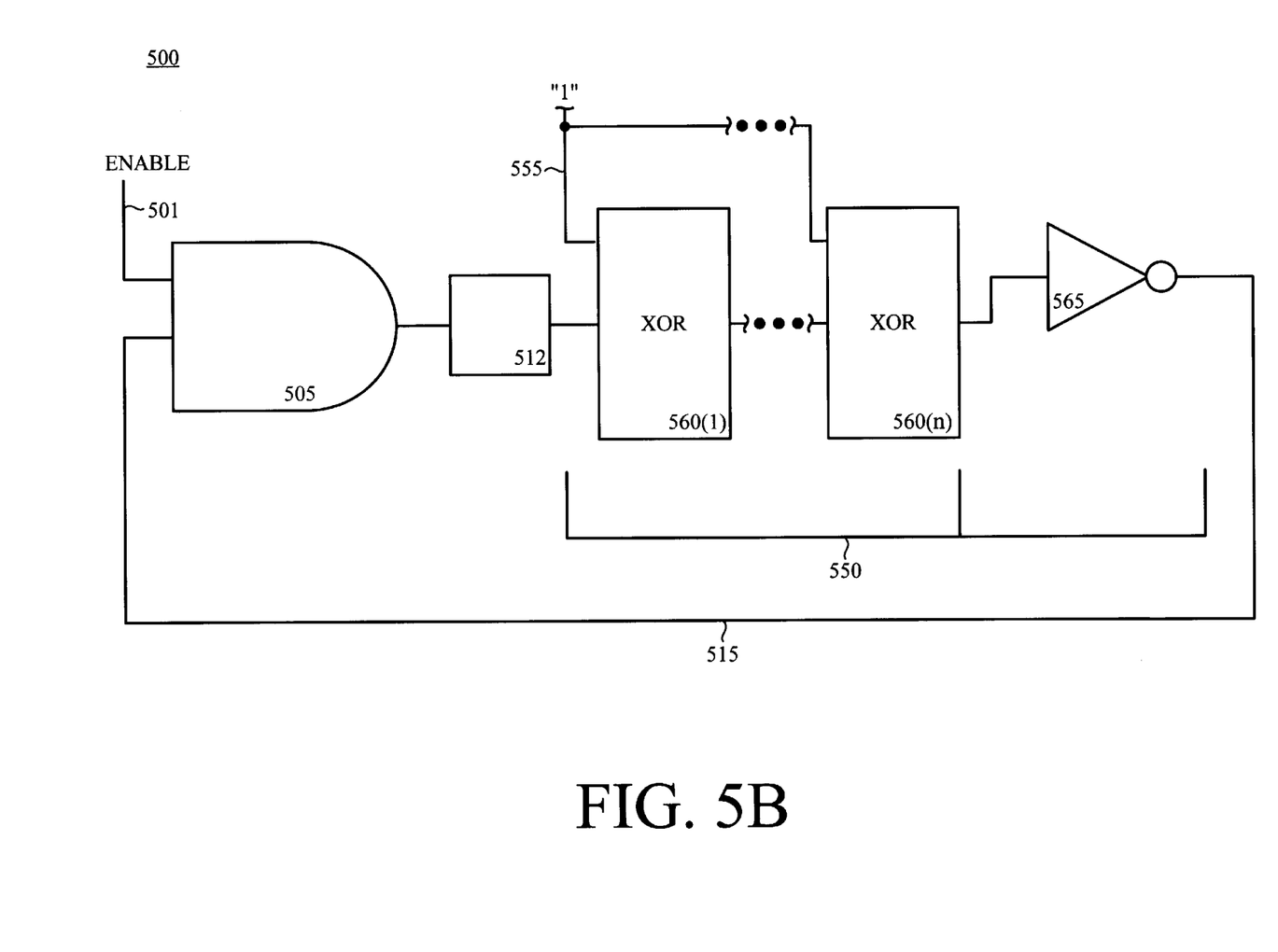
FIG. 5B is a circuit schematic diagram of one embodiment of the standard cell ring oscillator circuit of the present invention using serially coupled XOR gates.

Within jitter clock 30, the oscillators representing frequencies F1 and F2, above, are standard cell ring oscillator circuits ("SRO circuits") 500 in accordance with the present invention as described in FIGS. 5A and 5B.

It is appreciated that the use of a jitter clock 30 in the present invention is in apposite to conventional digital circuit design wherein considerable effort is made to minimize clock edge uncertainty, and any resultant metastable operation of flip-flops.

As further shown in FIG. 2, the outputs from XOR gates 40A, 40B are fed to XOR gates 80 and 90, respectively, and reclocked with the system clock signal (SYSCLK) using redundant D-type flip-flops 100A, 100B. The outputs (e.g., OUTPUT 1 and OUTPUT 2) from the flip-flops 110A and 100B represents two independent channels of non-deterministic data. It is appreciated that should a single point failure cause one channel of output data to fail, the remaining channel is still present. However, the randomizer circuit 10 can operate with a single channel.

Random Number Generator Circuit 20

Figure 3:
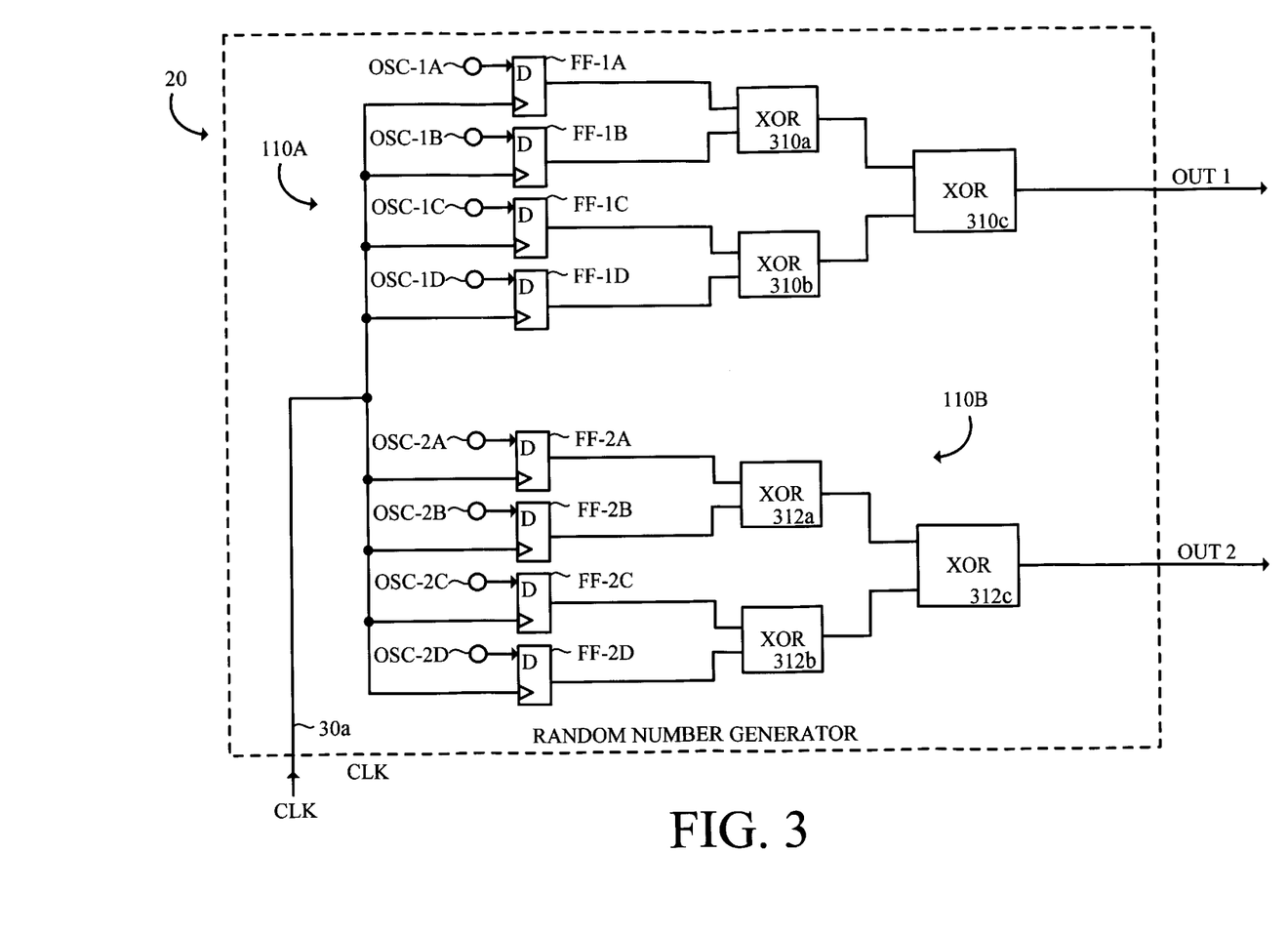
FIG. 3 is a block diagram of a dual-channel random number generator circuit in accordance with the present invention that uses the standard cell implemented ring oscillator circuit of the present invention.

FIG. 3 depicts the dual-channel random number generator circuit 20. Random number generator circuit 20 in one embodiment includes two metastable blocks 110A, 110B that are analogous, however, a single block can be used. Each block of 110A and 110B is composed of several frequency legs, each frequency leg consists of a flip-flop circuit and an oscillator (and the jitter clock signal 30a) circuit.

More specifically, using block 110A as an example, each block 110A, 110B contains a plurality of D-type flip-flops, e.g., FF-1A, FF-1B, FF-1C, FF-1D. Of course, a different number of D-type flip-flops can be used in each block, with no requirement that the number be equal or even. Clock signal line 30a (originating from jitter clock 30) is coupled to the clock port of each of these flip-flops FF-1A, FF-1B, FF-1C, FF-1D. The D-input to each flip-flop FF-1A, FF-1B, FF-1C, FF-1D is coupled to receive a frequency signal which is supplied from a separate free-running oscillator of oscillator circuits OSC-1A, OSC-1B, OSC-1C, and OSC-1D. Thus FF-1A is coupled to oscillator OSC-1A, FF-1B to oscillator OSC-1B, etc. A corresponding set of oscillator circuits OSC-2A, OSC-2B, OSC-2C, and OSC-2D is provided for block 110B. As used herein, each flip-flop and its associated unique oscillator circuit define a frequency leg.

The outputs of the flip-flops (e.g., FF-1A, FF-1B, FF-1C, FF-1D) of each frequency leg are called frequency leg outputs.

The oscillators OSC-1A, OSC-1B, OSC-1C, OSC-1D, OSC-2A, OSC-2B, OSC-2C, and OSC-2D (hereinafter "frequency leg oscillators") of the present invention are implemented using standard cell ring oscillator "SRO" circuits 500 of the present invention. Each SRO circuit 500 used in the frequency by oscillator circuits has a different number of internal gates such that each SRO circuit 500 implements a different frequency.

The frequency of each frequency leg oscillator is selected based upon a relative prime number to each frequency leg. In one exemplary embodiment, metastable block 110A uses the following frequencies: leg 1 (OSC-1C): 29 MHz, leg 2 (OSC-1B): 5 MHz, leg 3: (OSC-1C) 73 MHz, and leg 4 (OSC-1D): 3 MHz. In this exemplary embodiment, block 110B uses the following frequencies: leg 1 (OSC-2A): 7 MHz, leg 2 (OSC-2B): 11 MHz, leg 3 (OSC-2C): 97 MHz, and leg 4 (OSC-2D): 37 MHz. Of course, other prime frequency combinations, different from the above, can be used consistent within the scope of the present invention.

In one embodiment of the present invention, the frequency leg oscillator circuits are asynchronous to the jitter clock CLK signal supplied over 30a. This configuration ensures that the set up and hold-times of the D-type flip-flops of each block 110A and 110B (e.g., FF-1A, FF-1B) are violated, thus starting the generation of a random noise sequence. The flip-flops of blocks 110A and 110B (e.g., FF-1A, FF-1B) function in the same manner as the digital mixer described earlier with respect to jitter clock 30.

The particular implementation of the above frequency leg oscillators as standard cell ring oscillators is described in more detail with respect to FIG. 5A and FIG. 5B below.

As shown in FIG. 3, the outputs from flip-flop pairs FF-1A, FF-1B and FF-1C, FF-1D are XOR'd together using XOR gates 310a and 310b, respectively. The outputs of XOR gates 310a and 310b are then XOR'd by XOR gate 310c generating the OUT 1 signal. The XOR gates 310a–310c are coupled in a tree fashion and comprise an XOR circuit. Similarly, the outputs from flip-flop pairs FF-2A, FF-2B and FF-2C, FF-2D are XOR'd together using XOR gates 312a and 312b, respectively. The outputs of XOR gates 312a and 312b are then XOR'd by XOR gate 312c generating the OUT 2 signal. The XOR gates 312a–312c are coupled in a tree fashion and comprise an XOR circuit. It is understood that if an odd number of flip-flops are present in block 110A, the remaining odd flip-flop can be XOR'd with the OUT 1 signal, requiring an additional XOR gate (not shown). Similarly, if an odd number of flip-flops are present in block 110B, the remaining flip-flop can be XOR'd with the OUT 2 signal, requiring an additional XOR gate (not shown).

Although design of random number generator circuit 20 is independent of the type of D flip-flop used, the use of D-type flip-flops designed especially to eliminate synchronous failures should be avoided. By contrast, flip-flops are intentionally used in the present invention that exhibit synchronous failures, and result in a desired metastable state of operation such that flip-flop toggling occurs in an unpredictable manner.

XOR Tree Circuit 60 and Routing Network

Figure 4A:
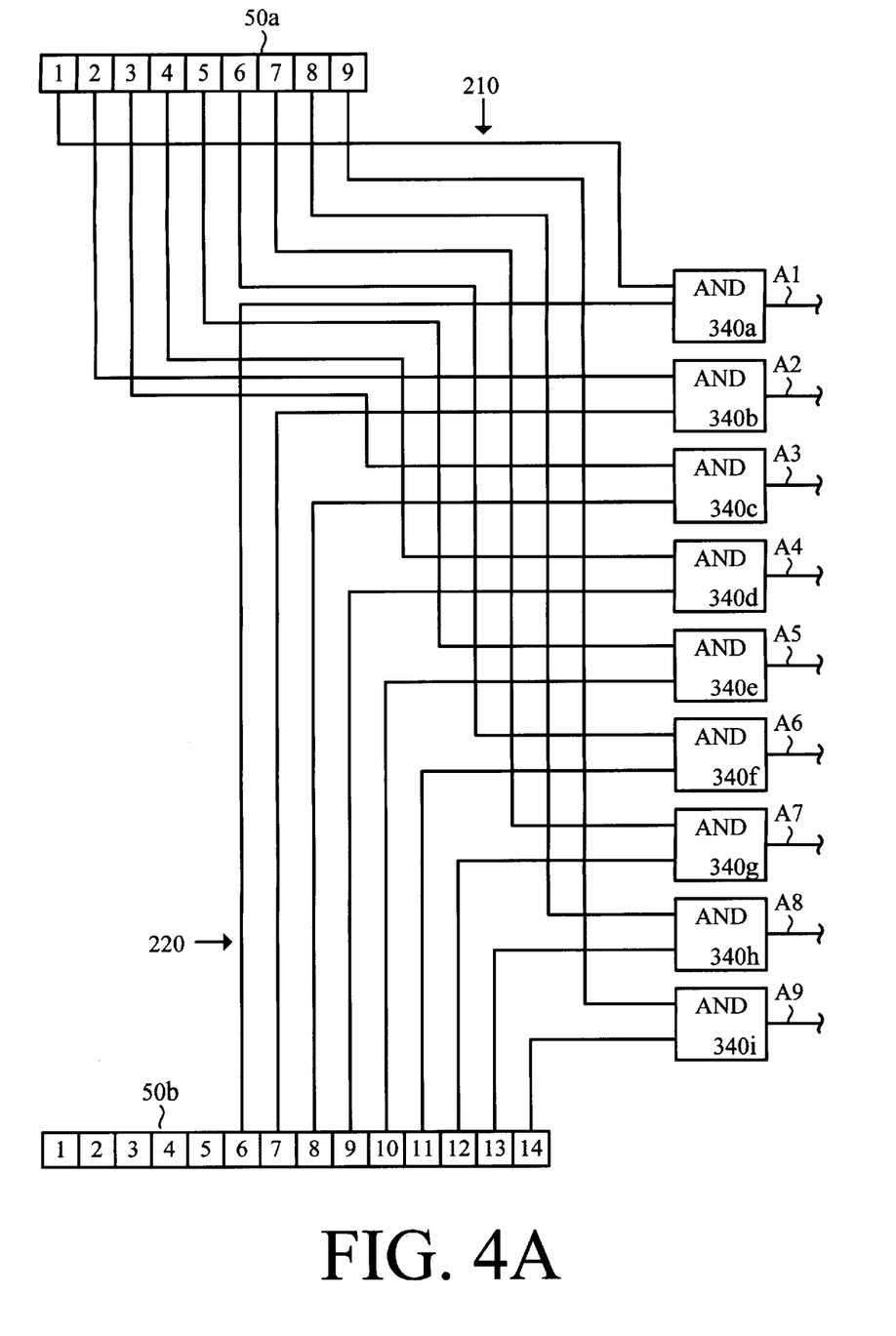
FIG. 4A illustrates a circuit routing network coupling outputs from certain shift registers of the randomizer circuit to an AND gate network in accordance with one embodiment of the present invention.

FIG. 4A illustrates the output signal lines of bus 210 and bus 220 in more detail in accordance with one embodiment of the present invention. The outputs of individual registers at bit positions 1, 2, 3, 4, 5, 6, 7, 8, and 9 of shift register 50A are carried over bus 210 and are coupled, respectively, to one input of AND gates 340a, 340b, 340c, 340d, 340e, 340f, 340g, 340h, and 340i. The outputs of individual registers at bit positions 6, 7, 8, 9, 10, 11, 12, 13, and 14 of shift register 50B are carried over bus 220 and are coupled, respectively, to the other input of AND gates 340a, 340b, 340c, 340d, 340e, 340f, 340g, 340h, and 340i. The output of AND gates 340a–340i are signals A1–A9, respectively.

Figure 4B:
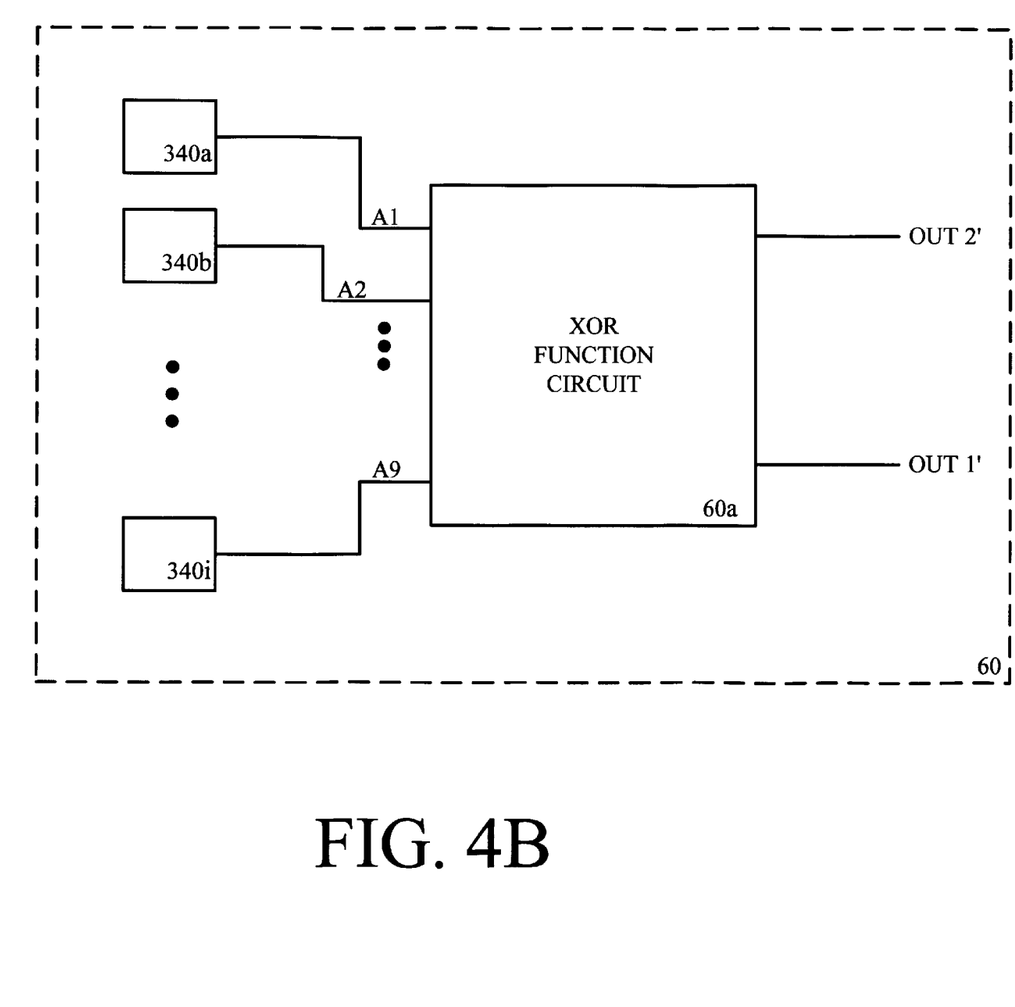
FIG. 4B illustrates a circuit network coupling the AND gate network of FIG. 4A with an XOR function circuit which generates output signals OUT 1' and OUT 2'.

FIG. 4B illustrates that the XOR tree circuit 60 is comprised of the AND gates 340a–340i in addition to an XOR function circuit 60a. Signals A1–A9 are coupled to the XOR function circuit 60a which generates output signals OUT 2' and OUT 1'.

The output OUT 2' and OUT 1' are generated by a variety of different XOR functions of the input signals A1–A9. Table I illustrates the possible functions that are realized within XOR function circuit 60a based on input signals A1–A9. Based on the functions within Table I below, one of ordinary skill in the art could readily realize the gate logic required to generate OUT 2' and OUT 1'.

TABLE I

OUT 1'=[[A1 XOR A3]XOR[A5 XOR A7]]XOR A9; or
OUT 1'=[[[A1 XOR A3]XOR A5]XOR A7]XOR A9
OUT 2'=[[A1 XOR A2]XOR[A3 XOR A7]]XOR[A8 XOR A9]; or
OUT 2'=[[[[A1 XOR A2]XOR A3]XOR A7]XOR A8]XOR A9

It is appreciated that OUT 1' can also be realized with other XOR functions of A1, A3, A5, A7 and A9 while OUT 2' can similarly be realized with other XOR functions of A1, A2, A3, A7, A8 and A9 in addition to those exemplary functions shown in Table I.

Preferably, randomizer circuit 10 includes testability features permitting continuity checks and verification of the integrity of the design using multiplex control. As described, randomizer circuit 10 generates non-deterministic data providing that flip-flop toggling and gate switching occur. Thus, it is allowable for testing to ensure that each frequency leg of the randomizer be accessible to detect toggling (e.g., a non-stuck condition), and to verify a non-stuck condition of the various XOR gates. Such testing is facilitated using multiplexer switches coupled to signal nodes of interest, e.g., breaking the oscillator legs. This is another advantage over the analog prior art designs which are difficult to test.

Standard Cell Ring Oscillator Circuit 500

With reference to FIG. 5A, the standard cell ring oscillator (SRO) circuit 500 of the present invention is shown in the general case. As discussed above, SRO circuit 500 is used as the frequency leg oscillators of block 110A and 110B of the random number generator circuit 20 (FIG. 3). SRO circuit 500 can also be used as the oscillator circuits that generate F1 and F2 with respect to the jitter clock 30. The SRO circuit 500 is implemented using a constant that defines the number of gates (e.g., inverter gates or XOR gates) in the feedback loop of the oscillator ring. The constant is changed based on the characterization of the particular silicon technology used. Each frequency leg of the random number generator circuit 20 is then assigned a specific number of gates in its SRO circuit 500 such that a particular frequency is realized for that respective frequency leg.

Use of the SRO circuit 500 allows different oscillator circuits to be readily designed for each frequency leg by altering the above constant, rather than completely redesigning each oscillator circuit as was required with the custom analog oscillator circuits of the past. This advantage of the SRO circuit 500 decreases design time for the overall randomizer circuit 10.

Unlike the analog custom designed oscillators of the past, the SRO circuit 500 of the present invention is fully implemented with standard digital cells available from a number of well known different standard cell libraries of different design technologies. Therefore, the SRO circuit 500 can be automatically synthesized given a small set of predefined constants. Further, the entire randomizer circuit 10, in accordance with the present invention, is implemented with digital standard cell gates since analog oscillators are not required.

FIG. 5A illustrates that in the general case, the SRO circuit 500 contains an input buffer 505, which in the implementation of FIG. 5A is an AND gate 505. An enable signal 501 (e.g., enabled when line 501=1) is fed into one input of AND gate 505 while the other input is coupled to a loopback line 515. The output of the AND gate 505 is coupled to an optional delay circuit 512 which is coupled to an input of an inverter stage circuit 510. The output from AND gate 505 can be directly coupled to the inverter stage circuit 510 eliminating the delay circuit 512. The inverter stage circuit 510 contains n inverter gates coupled in series, where n is an odd number to insure a signal inversion from input to output of circuit 510. In the example of FIG. 5A, n=3 and inverter stage circuit 510 consists of gates 510*a*, 510*b* and 510*c*. The output of the nth inverter of the inverter stage circuit 510 (e.g., the output of inverter 510*c* in this example) is coupled to loopback line 515 to provide the required feedback connection. It is appreciated that the frequency output of the SRO circuit 500 is taken at line 515. Each element of SRO circuit 500 of FIG. 5A is implemented using standard digital cells from a standard cell library.

It is appreciated that each inverter of the n inverters 510*a*–510*c* of FIG. 5A can also be realized with a configured XOR gate wherein each XOR gate has one input coupled to a logical "1."

One advantage of the SRO circuit 500 of FIG. 5A is that it can readily be re-characterized to (1) be ported from one design (e.g., silicon) technology to another, and (2) within a given design technology, it can be re-characterized to implement different frequencies of oscillation. In accordance with the implementation of FIG. 5A, in order to re-characterize SRO circuit 500 for different technology environments, the number of inverter gates (e.g., n) within the inverter stage circuit 510 is modified and SRO circuit 500 is then resynthesized automatically. The above procedure can also be used when SRO circuit 500 is used within the same technology environment but different frequencies are desired, e.g., for the different frequency legs of the random number generator circuit 20 (e.g., 29 MHz, 5 MHz, 73 MHz, 3 MHz, 7 MHz, 11 MHz, 97 MHz, and 37 MHz). In these cases, a separate SRO circuit 500 is typically required for each different oscillator. See Table II below for exemplary re-characterizations with a sample design environment.

FIG. 5B illustrates an alternate embodiment of the SRO circuit 500 that uses configured XOR circuits as inverting circuits. In this implementation, enable line 501 is coupled to one input of AND gate 505 and another input of AND gate 505 receives the loopback line 515. The AND gate 505 is coupled to an optional delay line 512 which is coupled to a inverter stage circuit 550. The AND gate 505 can also be directly connected to the input of the inverter stage circuit 550, eliminating delay circuit 515. In this implementation, the inverter stage circuit 550 includes n number of configured XOR gates, 560(1) to 560(*n*), coupled in series such that the output of each XOR gate is driven to one input of the next downstream XOR gate. In this embodiment, n is even. The other input of each XOR gate of the inverter stage circuit 550 is then coupled to a logical "1" (e.g., via line 555).

The output of the inverter stage circuit 550 (e.g., the output of the nth XOR gate 560(*n*)) is then coupled to an inverting output buffer circuit 565 (e.g., an inverter). The output of the inverter 565 is then coupled to the loopback line 515. The inverter 565 can be construed as part of the inverter stage circuit 550. It is appreciated that the frequency output of the SRO circuit 500 is taken at line 515. Each element of SRO circuit 500 of FIG. 5B is implemented using standard digital cells from a standard cell library.

Analogous to the SRO circuit 500 of FIG. 5A, the SRO circuit 500 implementation of FIG. 5B has the advantage that it can be re-characterized by altering the number of XOR gates (e.g., n) within the inverter stage circuit 550 and resynthesizing the circuit 500 in conjunction with a selected standard cell library. This re-characterization can be performed in order to adapt the SRO design 500 for different design technology environments or to adapt the SRO circuit 500 of FIG. 5B to provide oscillators having different frequencies of oscillation within the same technology design environment.

Figure 7A:
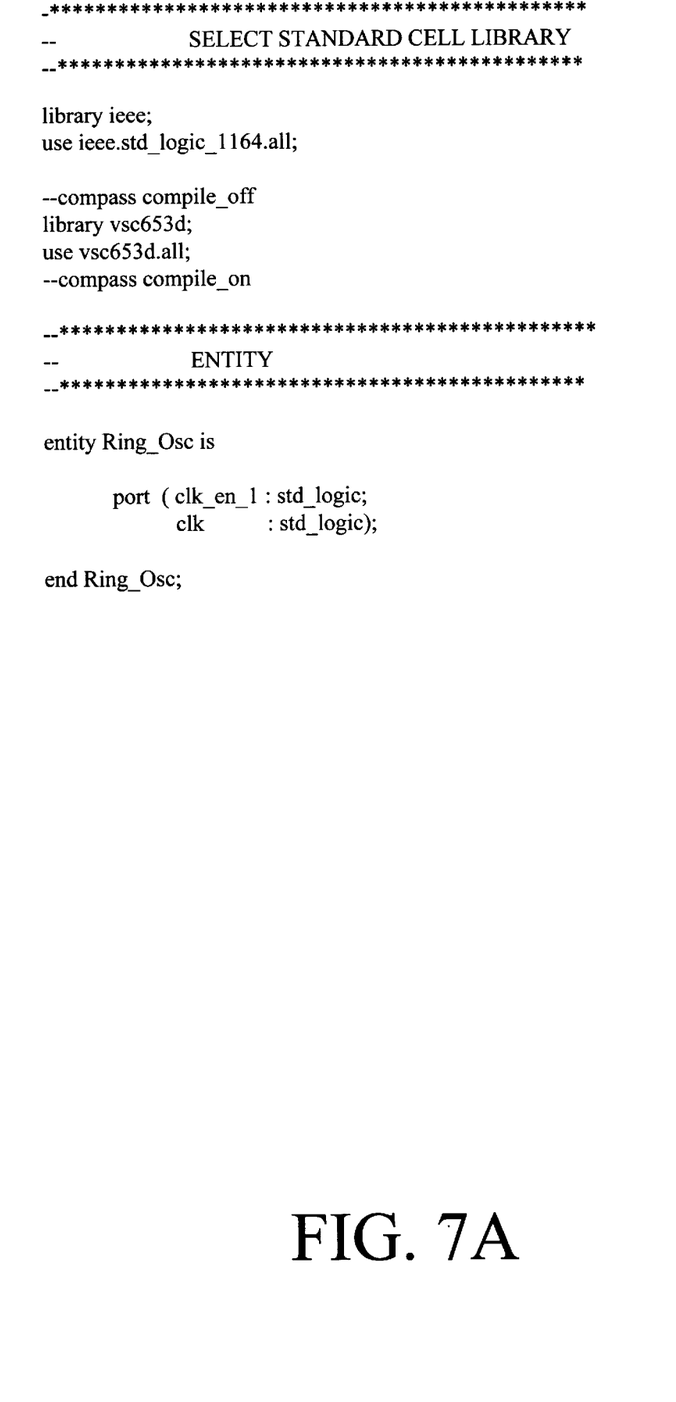
FIG. 7A and FIG. 7B illustrate a VHDL listing.
Figure 7B:
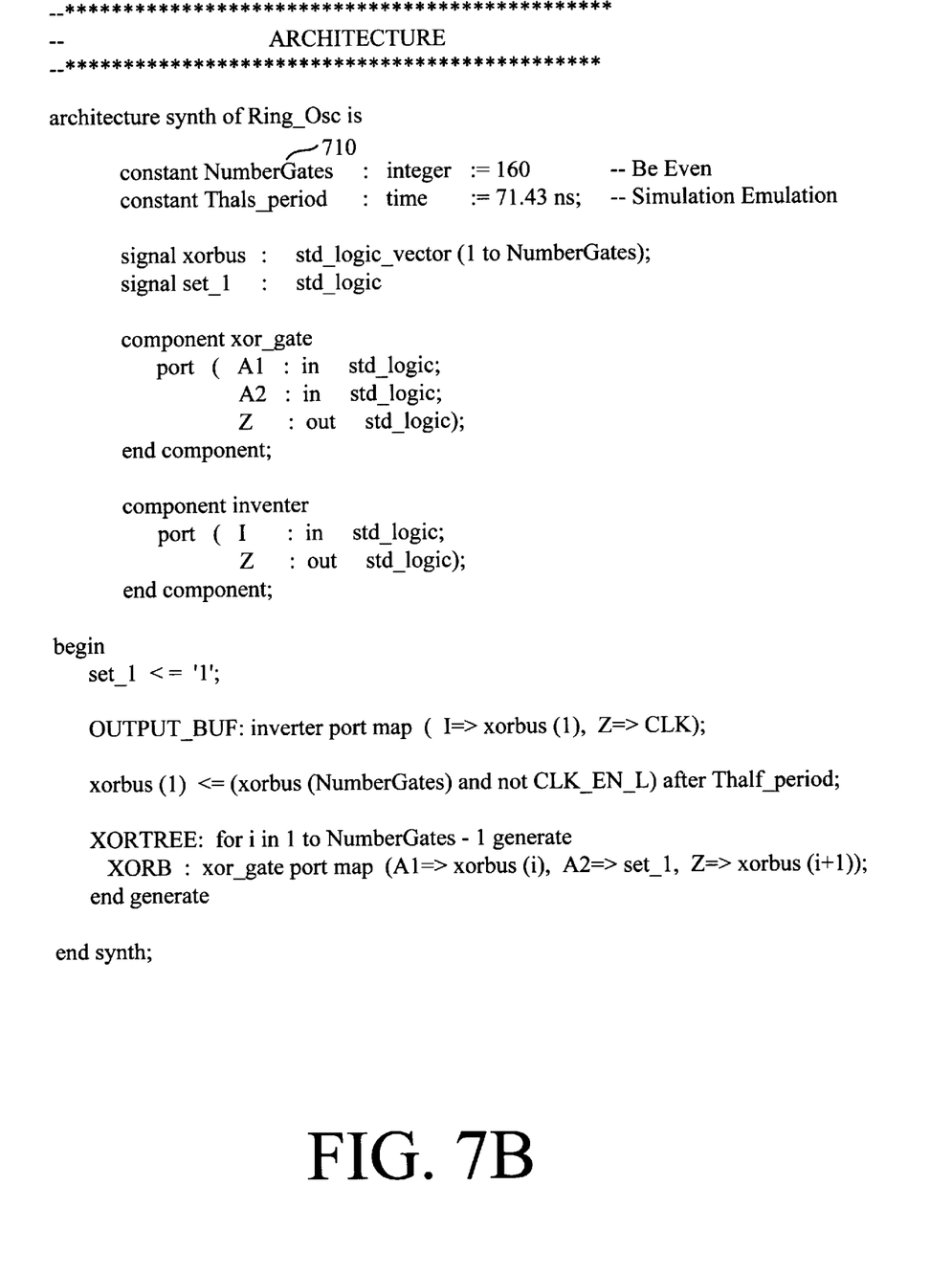

With respect to the SRO circuit 500 of FIG. 5B, an example VHDL listing is provided below. This VHDL listing is used within well known circuit synthesis systems to synthesize SRO circuit 500 of FIG. 5B using a standard cell library that can be of a variety of well known design technologies. The SRO circuit 500 of FIG. 5B is re-characterized by altering the constant 710 (FIG. 7B) "NumberGates" which represents the number of XOR gates within the inverter stage circuit 500 (e.g., n, an even number). In the particular sample VHDL listing (shown below), the technology is 0.6 micron Standard Cell CMOS, wherein n=160 produces an SRO circuit 500 at 7 MHz frequency.

VHDL LISTING

```
--*********************************
--  SELECT STANDARD CELL LIBRARY
--*********************************
library ieee;
use ieee.std_logic_1164.all;

--compass compile_off
library vsc653d;
use vsc653d.all;
--compass compile_on

--*********************************
--  E N T I T Y
--*********************************
entity Ring_Osc is port ( clk_en_1: in std_logic;
           clk      : out std_logic);

end Ring_Osc;

--*********************************
--  A R C H I T E C T U R E
--*********************************
architecture synth of Ring_Osc is constant NumberGates  : integer := 160;      -- Be Even
    constant Thalf_period : time    := 71.43 ns; -- Simulation Emula-
```

-continued

VHDL LISTING tion

```
signal xorbus : std_logic_vector(1 to NumberGates);
signal set_1  : std_logic;

component xor_gate
  port ( A1 : in std_logic;
         A2 : in std_logic;
         Z  : out std_logic );
end component;

component inverter
  port ( I : in std_logic;
         Z :out std_logic );
end component;

begin
  set_1 <= '1'

OUTPUT_BUF: inverter port map ( I=> xorbus(1), Z=> CLK);

xorbus(1) <= (xorbus(NumberGates) and not CLK_EN_L) after
  Thalf_period;

XORTREE: for i in 1 to NumberGates-1 generate
    XORB : xor_gate port map (A1=> xorbus(i), A2=> set_1,
    Z=>xorbus(i+1));
  end generate;

end synth;
```

As discussed above, the sample VHDL listing can be used to alter the number of XOR gates within the inverter circuit stage 550 of the SRO circuit 500. Within a given design technology environment, this re-characterization alters the frequency of oscillation. Within a 0.6 micron standard cell CMOS design technology environment, Table II below illustrates example frequency ranges obtained by utilizing specific numbers of XOR gates within the inverter circuit stage 550.

TABLE II

| Desired Frequency (MHz) | Number of XOR Gates in Inverter Stage 550 (e.g.. NumberGates) |
|---|---|
| 7 | 160 |
| 15 | 76 |
| 29 | 40 |
| 97 | 12 |

Based on the information of Table II, one of ordinary skill in the art can realize implementations of the SRO circuit 500 of FIG. 5B for each of the other frequency legs of the random number generator circuit 20 of the present invention.

Figure 6:
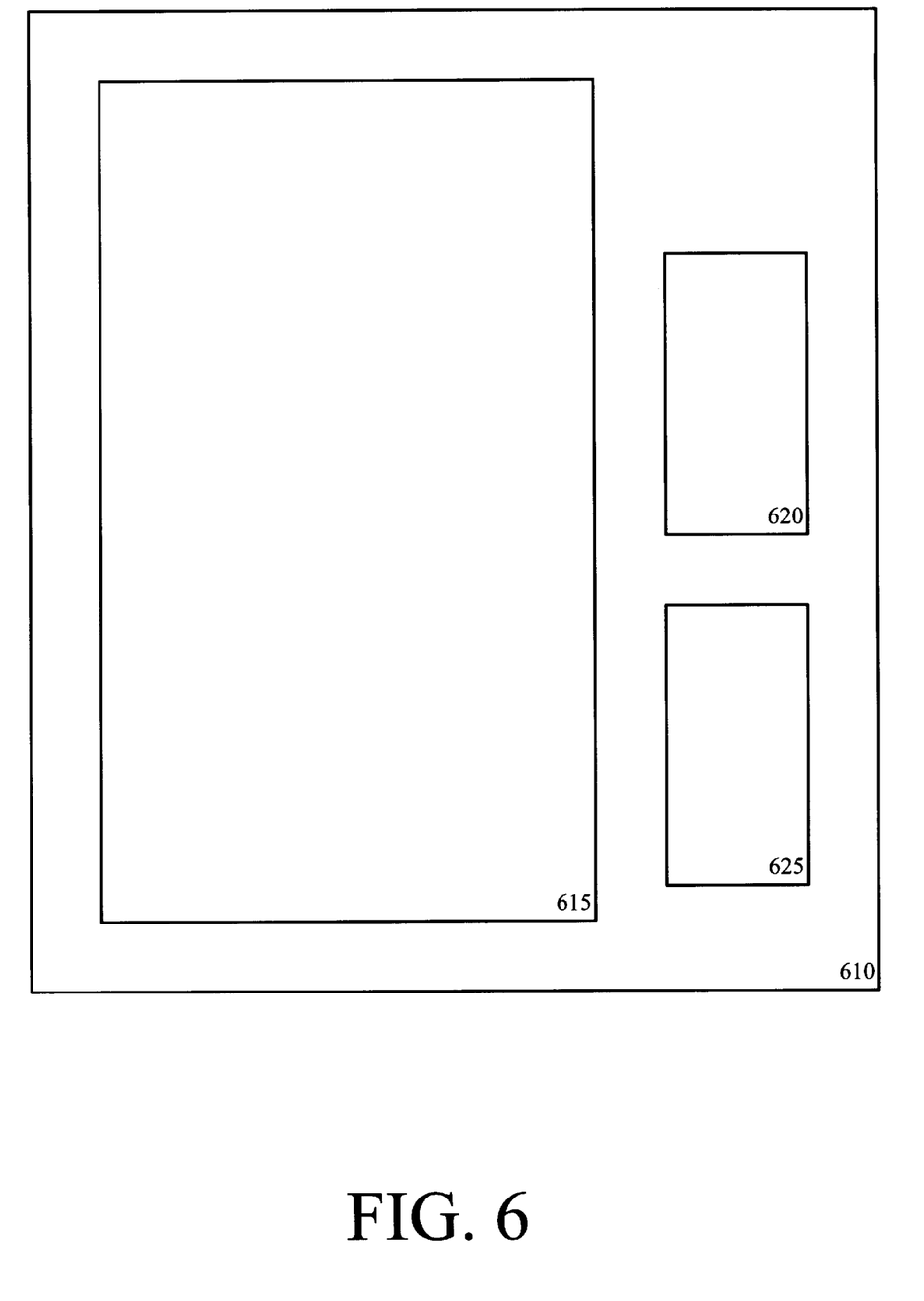
FIG. 6 is an integrated circuit layout of a randomizer circuit in accordance with the present invention that integrates the oscillator circuits of the frequency legs of the random number generator circuit into the standard cell layout area.

The implementations of FIG. 5A and FIG. 5B of SRO circuit 500 can be readily incorporated into the standard cell layout area of an integrated circuit device that implements a randomizer circuit (e.g., circuit 10). FIG. 6 illustrates such an integrated circuit layout 610 in accordance with the present invention. Layout 610 contains a standard cell layout area 615 and optionally separate layout areas for memory (e.g., RAM, ROM, etc.) 620, 625. By using the SRO circuit 500, made of standard cells, the SRO circuits 500 of the frequency legs can be readily placed within the standard cell layout area 615. It is the SRO circuits 500 that implement the frequency leg oscillators and the jitter clock 30 and control the output of the random number generator circuit 20.

In this fashion, the SRO circuits 500 and their routing circuitry are effectively hidden from external intrusion because the SRO circuits 500 appear, externally, no different from the remainder of the randomizer 10 standard cell circuitry. Further, by integrating these frequency leg oscillators 500 into the standard cell layout area 615, the block to block routing resources required of the prior art design are eliminated. This implementation poses great difficulty for one attempting to intrusively disconnect the frequency leg oscillators and/or the jitter clock 30 in order to force out a known random number seed (e.g., zero) from the randomizer 10. By placing the frequency leg oscillators and the jitter clock 30 oscillators within the standard cell layout 615, the resultant randomizer circuit 10 has greatly increased integrity and resistance against external intrusion that could otherwise comprise its functionality.

Another advantage of placing the SRO circuits 500 within the standard cell layout area 615 of FIG. 6 is that the overall integrated circuit density is increased and therefore the overall layout area is reduced. First, the design layout of circuit 500 (using standard cells) is smaller than the custom analog oscillators of the prior art that consumed a relatively large amount of layout area. Second, by integrating the circuits 500 into layout area 615, wasted layout area is eliminated that was required of the separate layout areas (e.g., 252a–252c, FIG. 1) of the prior art. Also, block to block routing resources (e.g., 254a–254d, FIG. 1) of the prior art are also eliminated within the present invention, thus further reducing required layout area. It is also noted that SRO circuits 500 consume less power than the custom analog oscillators of the prior art.

In one embodiment of the present invention, the standard cells for each frequency leg of the random number generator circuit 20 are seeded into their own rows during the layout of the entire randomizer design. The frequency legs are then isolated by requiring a minimum row spacing on each of the rows, however, other row spacing can be utilized within other implementations of the present invention. Additional isolation can be added through the use of diffusion contact to the wells between the different rows to prevent frequency locking between adjacent rows. This also prevents oscillator frequency ("beating").

Another advantage of using SRO circuits 500 as the oscillators for the frequency legs of the random number generator circuit 20 is that the timing characteristics of the SRO circuit 500 varies with the particular process used in the manufacturing of the SRO circuit 500 and with temperature. For instance, the frequency realized by SRO circuit 500 is dependent on its manufacturing process and environment. This causes different integrated circuit chips to have different frequency values, increasing the overall random nature and unpredictability of the random number seed from "chip" to "chip." Further, the frequency output by each SRO circuit 500 also varies with the particular temperature at which the circuit operates. This causes the same integrated circuit chip to have different frequency values from one operational time to another, again increasing the overall random nature and unpredictability of the random number seed. It is appreciated that the SRO circuits 500 can also be adjusted by hand-editing the layout to ensure that a metastable condition occurs varying with process and temperature.

The individual oscillator legs can also be characterized for different process points, e.g., selecting one frequency at worst case and another at the best case.

It is appreciated that the present invention randomizer circuit 10 can used as a peripheral for a microprocessor, e.g., as a random number generator, or can be used as a stand-alone device. Further, the randomizer architecture 10 disclosed is substantially independent of the technology used to implement the units comprising the invention, e.g., the flip-flops, the registers, the logic gates. As noted, all of these components can advantageously be implemented in standard cell libraries.

The preferred embodiment of the present invention, a standard cell implemented ring oscillator circuit for used within frequency legs of a random number generator, is thus described. While the present invention has been described in particular embodiments, it should be appreciated that the present invention should not be construed as limited by such embodiments, but rather construed according to the below claims.

What is claimed is:

1. In an integrated circuit, a random number generator circuit for generating a pseudo random sequence of bits, said circuit comprising:
   (a) a plurality of frequency legs each generating a frequency leg output signal that contains non-deterministic data, wherein each frequency leg comprises a respective frequency leg oscillator circuit that generates a frequency signal for said frequency leg, said plurality of frequency leg oscillator circuits disposed within a standard cell area of said integrated circuit to avoid ready detection thereof and wherein each frequency leg further comprises a D-flip-flop for receiving, at a D input, a respective frequency signal from a respective frequency leg oscillator circuit and for receiving, at a clocked input, a jitter clock signal;
   (b) an XOR circuit disposed within said standard cell area and coupled to receive frequency leg output signals from said plurality of frequency legs, said XOR circuit for generating an output signal of said pseudo random sequence of bits,
   wherein each frequency leg oscillator circuit is a ring oscillator circuit fully implemented with digital standard cells from a standard cell library, said digital standard cells having wells and rows, and wherein each frequency leg oscillator circuit further comprises:
      (1) an inverter stage circuit of standard cells coupled to receive an input signal at an input port, said inverter stage circuit comprising n number of serially coupled inverting circuits wherein an output of an nth inverting circuit of said inverter stage circuit is an inversion of said input signal, wherein said inverter stage circuit is implemented using a constant that defines said number, n, of inverting circuits wherein said constant can be altered during design to achieve a constant frequency of oscillation across different silicon technologies and is also adjustable to achieve different oscillation frequencies for a same silicon technology; and
      (2) a loopback connection for feeding back said output of said nth inverting circuit to said input port of said inverter stage circuit; and
   (c) a jitter clock circuit, wherein said jitter clock signal is generated from said jitter clock circuit, wherein said jitter clock circuit comprises a ring oscillator fully implemented with digital standard cells from said standard cell library.

2. A random number generator circuit as described in claim 1 wherein said inverter stage circuit also comprises an input gate for receiving said output of said nth inverting circuit and, when enabled, is also for supplying said output of said nth inverting circuit to said input port of said inverter stage circuit.

3. A random number generator circuit as described in claim 1 wherein said inverting circuits are inverter gates.

4. A random number generator circuit as described in claim 1 wherein said inverting circuits are configured XOR gates.

5. A random number generator circuit as described in claim 1 wherein said plurality of frequency legs comprise at least four frequency legs and wherein said XOR circuit comprises at least three tree coupled XOR gates.

6. In an integrated circuit, a random number generator circuit for generating a pseudo random sequence of bits, said circuit comprising:
   (a) a plurality of frequency legs each generating a frequency leg output signal that contains non-deterministic data, wherein each frequency leg comprises a respective frequency leg oscillator circuit that generates a frequency signal for said frequency leg, said plurality of frequency leg oscillator circuits disposed within a standard cell area of said integrated circuit to avoid ready detection thereof and wherein each frequency leg of said plurality of frequency legs further comprises a D-flip-flop for receiving, at a D input, a respective frequency signal from a respective frequency leg oscillator circuit and for receiving, at a clocked input, a jitter clock signal;
   (b) an XOR circuit disposed within said standard cell area and coupled to receive frequency leg output signals from said plurality of frequency legs, said XOR circuit for generating an output signal of said pseudo random sequence of bits,
   wherein each frequency leg oscillator circuit is a ring oscillator circuit fully implemented with digital standard cells from a standard cell library, said digital standard cells having wells and rows, and wherein each frequency leg oscillator circuit further comprises:
      (1) an inverter stage circuit coupled to receive an input signal at an input port, said inverter stage circuit comprising n number of serially coupled XOR gates, wherein an output of an nth XOR gate of said inverter stage circuit is not an inversion of said input signal, wherein said inverter stage circuit is implemented using a constant that defines said number, n, of inverting circuits wherein said constant can be altered during design to achieve a constant frequency of oscillation across different silicon technologies and is also adjustable to achieve different oscillation frequencies for a same silicon technology;
      (2) an inverting buffer circuit coupled to receive said output of said nth XOR gate; and
      (3) a loopback connection for feeding back an output of said inverting buffer circuit to said input port of said inverter stage circuit; and
   (c) a jitter clock circuit, wherein said jitter clock signal is generated from said jitter clock circuit and wherein said jitter clock circuit comprises a ring oscillator circuit fully implemented with digital standard cells from said standard cell library.

7. A random number generator circuit as described in claim 6 wherein said inverter stage circuit also comprises an input gate for receiving said output of said inverting buffer circuit and, when enabled, is also for supplying said output of said inverting buffer circuit to said input port of said inverter stage circuit.

8. A random number generator circuit as described in claim 6 wherein said inverting buffer circuit is an inverter gate.

9. A random number generator circuit as described in claim 6 wherein n is an even number.

10. A random number generator circuit as described in claim 6 wherein said plurality of frequency legs comprise at least four frequency legs and wherein said XOR circuit comprises at least three tree coupled XOR gates.

11. In an integrated circuit, a randomizer circuit for generating a non-deterministic sequence of bits, said circuit comprising:
(a) a plurality of frequency legs each generating a frequency leg output signal, wherein each frequency leg comprises a respective frequency leg oscillator circuit that generates a frequency signal for said frequency leg, said plurality of frequency leg oscillator circuits disposed within a standard cell area of said integrated circuit to avoid ready detection thereof and wherein each frequency leg of said plurality of frequency legs further comprises a D-flip-flop for receiving, at a D input, a respective frequency signal from a respective frequency leg oscillator circuit and for receiving, at a clocked input, a jitter clock signal;
(b) a first XOR circuit coupled to receive frequency leg output signals from said plurality of frequency legs, wherein each frequency leg oscillator circuit is a ring oscillator circuit having n number of serially coupled gates and fully implemented with digital standard cells from a standard cell library, said digital standard cells having wells and rows, wherein said inverter stage circuit is implemented using a constant that defines said number, n, of gates wherein said constant can be altered during design to achieve a constant frequency of oscillation across different silicon technologies and is also adjustable to achieve different oscillation frequencies for a same silicon technology;
(c) a second XOR circuit coupled to receive an output signal from said first XOR circuit and for generating an output of said non-deterministic sequence of bits;
(d) a serial shift register for receiving said output from said second XOR circuit and clocked to a jitter clock signal;
(e) an XOR tree circuit coupled to receive inputs from bit positions of said serial shift register and for generating an output signal coupled to an input of said second XOR circuit, wherein said first and second XOR circuits, said serial shift register and said XOR tree are all implemented in said standard cell area; and
(f) a jitter clock circuit, said jitter clock signal is generated from said jitter clock circuit and wherein said jitter clock circuit comprises a ring oscillator circuit fully implemented with digital standard cells of said standard all library.

12. A randomizer circuit as described in claim 11 wherein each frequency leg oscillator circuit further comprises:
(1) an inverter stage circuit coupled to receive an input signal at an input port, said inverter stage circuit comprising n serially coupled inverting circuits wherein n is an odd number; and
(2) a loopback connection for feeding back an output of an nth inverting circuit to said input port of said inverter stage circuit.

13. A randomizer circuit as described in claim 11 wherein each frequency leg oscillator circuit further comprises:
(1) an inverter stage circuit coupled to receive an input signal at an input port, said inverter stage circuit comprising n serially coupled XOR gates wherein n is an even number;
(2) an inverting circuit coupled to an output of said inverter stage circuit; and
(3) a loopback connection for feeding back an output of said inverting circuit to said input port of said inverter stage circuit.

14. A randomizer circuit as described in claim 12 wherein said inverter stage circuit also comprises an input gate for receiving said output of said nth inverting circuit and, when enabled, is also for supplying said output of said nth inverting circuit to said input port of said inverter stage circuit.

15. A randomizer circuit as described in claim 12 wherein said plurality of frequency legs comprise at least four frequency legs and wherein said XOR circuit comprises at least three tree coupled XOR gates.

* * * * *